United States Patent [15] 3,703,050
Edwards [45] Nov. 21, 1972

[54] PALLET SPOOL ASSEMBLY

[72] Inventor: Paul R. Edwards, Redondo Beach, Calif.

[73] Assignee: Edwards Enterprises of Orlando Inc., Orlando, Fla.

[22] Filed: Nov. 3, 1970

[21] Appl. No.: 86,535

[52] U.S. Cl. ..................47/34.11, 47/39, 211/131
[51] Int. Cl. ..................................................A01g 9/02
[58] Field of Search ......47/34.12, 34.11, 39; 206/53; 220/65 R, 97 R; 211/131, 129, 144, 163; 108/103

[56] References Cited

UNITED STATES PATENTS

| | | | |
|---|---|---|---|
| 2,289,212 | 7/1942 | Rinnela | 211/131 |
| 3,179,070 | 4/1965 | Beller | 108/103 |
| 3,266,634 | 8/1966 | Tintary | 211/131 |
| 764,307 | 7/1904 | Scahill | 47/39 |
| 3,095,969 | 7/1963 | Morrison | 206/53 |
| 3,369,691 | 2/1968 | Tohchung | 220/97 R |
| 307,936 | 11/1884 | Fry | 47/34.12 |
| 151,995 | 6/1874 | McGuire | 47/39 |
| 613,986 | 11/1898 | Gadbury | 47/39 UX |
| 3,108,401 | 10/1963 | Richardson | 47/39 |
| 3,379,304 | 4/1968 | Mertz | 206/65 R |

FOREIGN PATENTS OR APPLICATIONS 679,986   9/1952   Great Britain.............211/131

Primary Examiner—Robert E. Bagwill
Attorney—James E. Bryan

[57] ABSTRACT

This invention relates to a pallet spool assembly comprising a central hub having means therein whereby a plurality of spools may be stacked, a substantially planar surface surrounding the hub and adapted to support a plant-growth medium, and rim means surrounding said planar surface and being of a height sufficient to retain a plant-growth medium on said planar surface.

Figure 3:
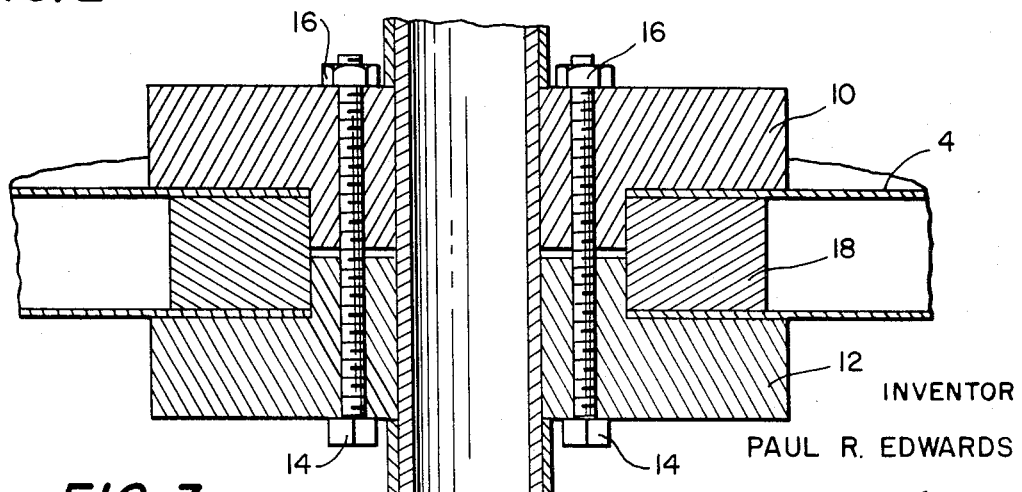

2 Claims, 6 Drawing Figures 3,703,050

INVENTOR
PAUL R. EDWARDS

James E. Bryan
ATTORNEY

INVENTOR
PAUL R. EDWARDS

ATTORNEY

PALLET SPOOL ASSEMBLY

This invention relates to a pallet spool assembly which can be employed for supporting a plant growth medium and/or a plurality of growing plants. Alternatively, the pallet spool assembly can be employed for shipping a plant growth medium to a nursery, for example where seedlings can be placed in the plant growth medium and after which the pallet spool assembly can be employed for further shipment of the growing plants.

In copending application Ser. No. 695,975, filed Jan. 5, 1968, plant growing means are disclosed which means comprise one or more bodies which may be compressed to substantially reduce the size thereof, thereby requiring less storage space and lower freight charges. The bodies are of porous construction whereby they can be watered without danger of overwatering as the sides will drain as well as the bottoms thereof. This porous construction also enables plants to grow rapidly when transplanted since the roots thereof can easily penetrate the porous walls of a body.

A plurality of bodies of plant growth material may be secured in predetermined spaced relationship to a suitable connecting means or they may be made in the form of continuous strips or blocks. This arrangement permits a plurality of bodies to be readily handled at one time, such as when putting them on a growing bench in groups up to 70 or more, thereby reducing the amount of time and effort involved. The construction whereby the bodies are placed on a suitable connecting means enables the bodies to be maintained in spaced relationship during shipping operations, the connecting means affording a convenient means for attaching the bodies in place within a shipping container.

The plant growing means described in the copending application, supra, may be employed as a plant growing medium in combination with the pallet spool of the present invention, or any other type of plant growing medium also any be employed in combination therewith. Preferred, however, is the plant growing medium in a continuous strip which may be wound onto and unwound from the pallet spool of the present invention.

A strip of plantable medium of any suitable type can be wound on the pallet spool of the present invention, with the plantable side up, as the plantable medium comes off of a production line. The pallets also can be stacked and bound together for shipment and, upon being received by a grower, the strips of plantable medium can be wetted and, as they are unwound from one pallet to another, they can be planted with seed or small plants or cuttings.

The rotation of the pallets for transfer can be by means of an electric motor or any other suitable source of power. After planting, the grower can again stack the pallets using spacers to prevent the weight from pressing on the planted strips and then can move the pallets by a truck or a trailer to a growing area.

A fork-lift can be employed to remove the pallets from the truck or trailer and place them in their growing location. If, during the growing process, the plants require more space, the pallets can be turned and the strips unwound from the pallet on which they have been growing onto another pallet at which time a spacer strip equal to the amount of additional space required by the plants is placed either permanently or temporarily between adjacent turns of the strips.

When the plants have completed their growth, the spacer strips can be removed and the planted strips again closed together by rewinding. The pallets then can be again stacked with larger spacers to allow for the height of the plants and can be again bound together for shipment.

In a garden shop, the plants can be sold by cutting the strip into a length containing the number of plants desired by the customer or, if the plants are to be field planted, the pallets are mounted on a planting machine and rotated to supply the plants at a rate to match the ground speed of the planter and the space at which they are to be planted in a row.

The pallet spools of the present invention are constructed with a central hub which preferably is limited in height to the height of the plant growth medium used on the growing surface of the pallet. The diameter of the hub should be large enough that the strips will wind around it without breaking. A height of 2 inches and a diameter of 12 inches has been found to give good results. Most of the weight of the pallets when stacked is carried on the central hub. In one embodiment of the present invention, guide points are added to the hubs as an aid in stacking. These points fit into each other so they are not limited to a height of 2 inches above the hub.

The pallet spools are round, or at least rounded at the corners, so that bands can be placed around two adjacent pallets in a stack. The bands are sufficiently wide to span the space between two adjacent pallets and cover the edges thereof. By this overlapping of bands on the edges of each pallet, except the lower and upper one, the entire stack is rigidly secured together. The bands may be drawn tight by means of bolts and wing nuts, or any other convenient means.

When shipping plants and strips on the round pallets bound together by overlapping bands in accordance with the present invention, no additional container will be necessary unless additional insulation against heat or cold is required. The top pallet of any stack will act as a cover and will not carry any plants thereon.

The pallet spools of the present invention are reuseable and, because of this, the factory making and selling strips of plant growth medium can use pallets for the bottom and top only of a stack of wound rolls of strips. Between the other layers of strips, a thin separator such as cardboard, for example, may be used instead of a pallet.

During the growing period, automatic overhead sprinkler irrigation and fertilization can be employed in combination with the pallet spool of the present invention. A riser can be placed in the pallet hub carrying a single irrigation head capable of covering an area of about 8 feet in diameter. The most desirable diameter of the pallet spools of the present invention is slightly under 8 feet. This size is as large as convenient to handle with a fork-lift truck and it also will fit inside the cubical containers used for moving furniture. It also is a most desirable size for a grower to use as it conserves growing space.

The pallet spool consists of a number of parts and includes a hub or bearing, which can be made in one or more parts, and which supports the plant growing surface. In one embodiment of the present invention, the hub includes a retainer, which is a bolt and nut assembly securing two pieces of the hub together and clamping them to the platform which forms the plant growing surface. Surrounding the platform is a raised side or rim which is used to retain the strips of plant growing medium and water when sub-irrigation is employed. The rim may be of any desired height, for example one to twelve inches. The hub will retain the water at the center of the pallet. The water level can be controlled, if desired, by holes located in the rim at a desired distance from the upper surface of the platform.

In one embodiment of the invention, a pipe or riser is employed which fits inside a central aperture in the hub. The length of the pipe or riser will depend upon whether it is supporting one pallet in a nursery or several stacked for shipment. In the nursery, a column is cemented into the ground so that the pallets are supported at the proper distance from the ground. A bolt is placed through the hole in the column on which the hub rests but is free to turn. A shipping column ordinarily would be nearly 8 feet long so that a stack of pallets would fit inside a van or railway car.

Bands are employed for securing a stack of pallets together while they are shipped. Starting at the bottom of a stack, a band is drawn tight around the perimeters of the lower pallets. The next band is drawn around the second and third pallets and this procedure is continued until all the pallets are secured together. The bands have ridges in the circumference thereof which prevent them from slipping down after they are clamped about the pallets.

Spacers also are employed when stacking to maintain a separation between the pallets equal to the height of the plants on the growing surface. The width of the spacers and the width of the bands are mutually dependent. The diameter of the central aperture in the spacer is the same as that of the hub. The bands are wide enough so that the bottom of the bottom band rests on the floor as does the bottom of the hub. The weight of the stack of pallets is supported primarily by the hub. Bands are not an absolute necessity and another method which can be employed is to use four posts equally spaced around the circumference of a stack of pallets. These posts can be recessed into the pallets so that corrugated cardboard or other materials can be stapled around the assembly for protection from wind, heat, or cold.

Figure 1:
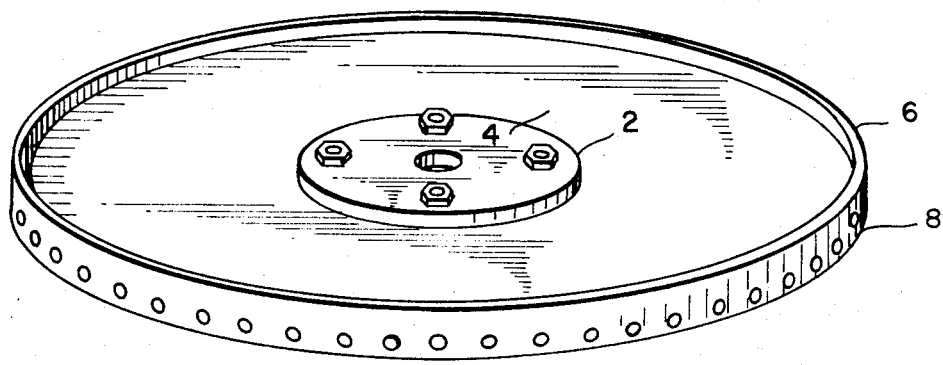
Figure 2:
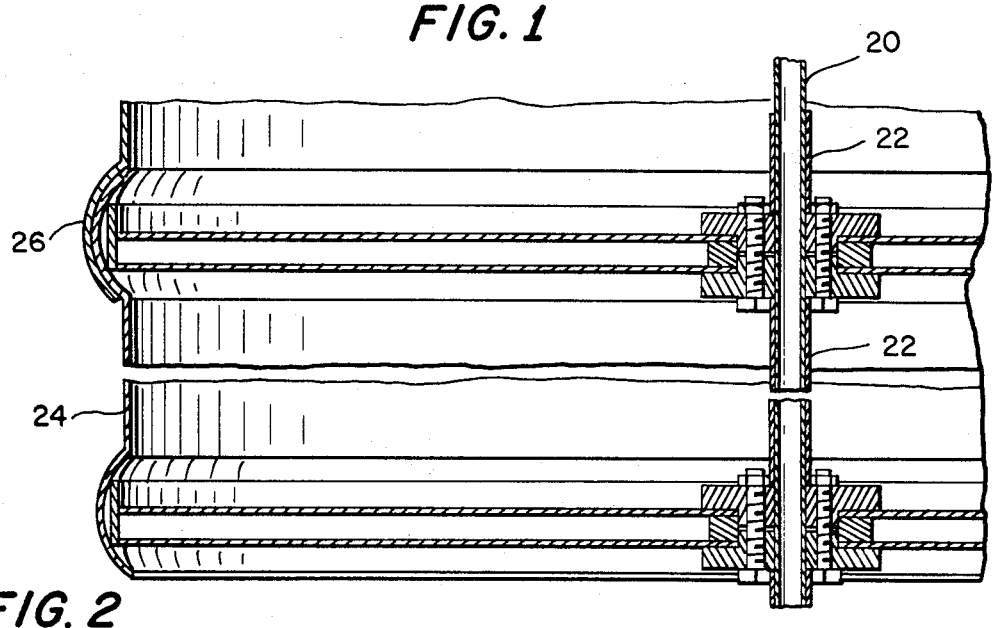
Figure 4:
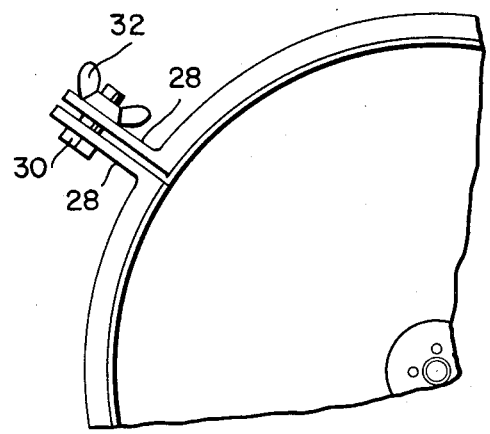
Figure 5:
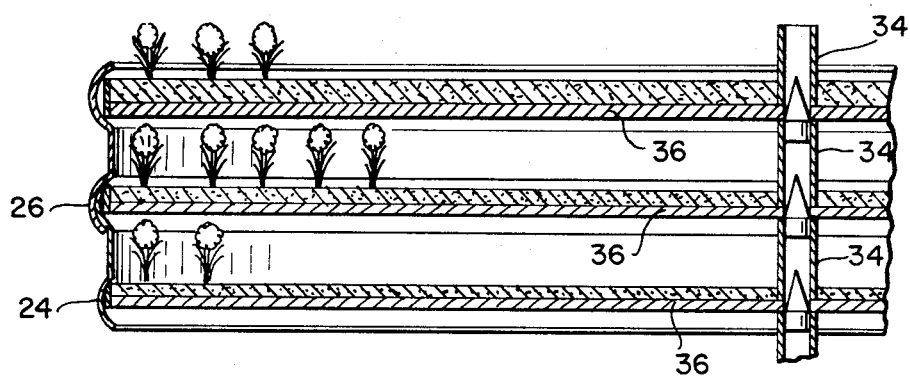
Figure 6:
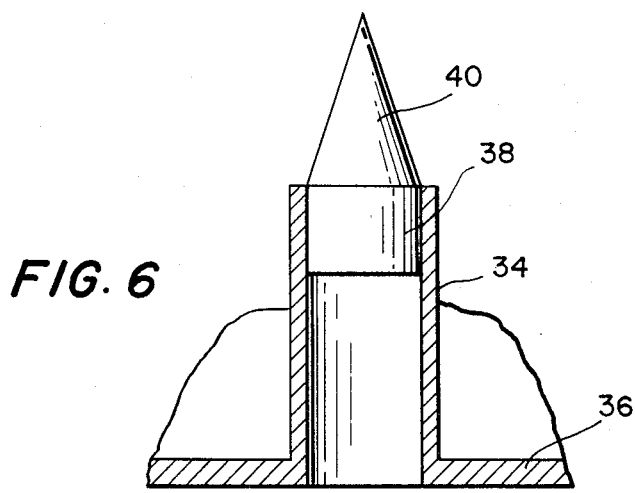

The invention will be further illustrated by reference to the accompanying drawings in which FIG. 1 is a perspective view of one embodiment of the pallet spool of the present invention, FIG. 2 is a fragmentary view in section showing a plurality of the pallet spools according to FIG. 1 stacked on a central riser, FIG. 3 is a detail view of the hub of the pallet spool shown in FIG. 1, FIG. 4 is a detail view of the clamping means for clamping a band around adjacent pallet spools, FIG. 5 is a fragmentary view partially in section showing another embodiment of the pallet spool of the present invention stacked together for shipment, and FIG. 6 is a detail view of the hub of the pallet spool of FIG. 5.

Referring to FIG. 1, The pallet spool comprises a hub 2 having a central aperture therein and a substantially planar growing surface supported by the hub 2. Secured to the periphery of the planar growing surface is an upstanding rim 6 which may be secured to the planar growing surface by means of a plurality of nails 8 or by other suitable means.

As shown in FIG. 3, the hub 2 is composed of two parts 10 and 12 which are secured together by a plurality of bolts 14 having the nuts 16 thereon. The two parts 10 and 12 of the hub support the planar growing surface 4 and this growing surface may be formed in two separate pieces having the spacer 18 therebetween, as shown in FIG. 3, or the growing surface 4 may be formed from a single sheet of material. The entire assembly may be fabricated from any suitable material such as wood, metal, plastic, and the like.

Referring to FIG. 2, a plurality of the pallet spools of FIG. 1 is shown in stacked relationship on a riser 20. The individual pallet spools are spaced between each other by means of a sleeve spacer 22 placed between adjacent pallets, the height of the spacer being determined by the height of the plants or plant growing medium between the spools. The spools are clamped together by means of overlapping bands, the lower of which, designated by numeral 24, is overlapped by the next successive band 26, thereby forming a rigid unitary construction when a plurality of bands are locked in place around a succession of pallet spools having the spacers 22 therebetween.

As shown in FIG. 4, the bands 24 and 26 may be tightened by means of an assembly including the projections 28 having the bolt 30 passing therethrough and the wing nut 32 thereon.

Referring to FIG. 5, another embodiment of the present invention is shown and, in this embodiment, a hub is employed which is integral with the substantially planar plant growing surface. The hub is best shown in FIG. 6 and includes the cylindrical upstanding portion 34 which may be integral with or secured to the plant growing surface 36. The upper shoulder 38 of the spacer 34 serves as a support for another pallet spool to be stacked thereon and the guide point 40 is inserted into the bottom of the next succeeding pallet spool. The guide point 40 may be secured to the spacer 34 by means of a press-fit or by screws, not shown, or in any other suitable manner.

As shown in FIG. 5, a plurality of pallet spools are stacked together on the spacers 34 and, in this embodiment, the planar plant growing surfaces 36 are formed of a single sheet of material although they could be formed of separate individual elements as in the embodiment of FIG. 2. The bands 24 and 26 are constructed in the same manner as those described in accordance with FIG. 2 above.

From the foregoing, it is apparent that the pallet spools of the present invention may be employed for the shipment of a plant growth medium in the form of continuous strips which may be unwound from the pallet spools mounted on a riser or they may be employed for the shipment of a plurality of growing plants. If the plants are growing in continuous strips of plant growing medium the plants also may be withdrawn in series by rotating the pallet spools mounted on a riser.

It will be obvious to those skilled in the art that many modifications may be made within the scope of the present invention without departing from the spirit thereof, and the invention includes all such modifications.

What is claimed is:

1. A pallet spool assembly comprising riser means, a plurality of substantially planar pallet means rotatably mounted on said riser means at spaced intervals, said pallet means being of substantially the same diameter and adapted to support a plant-growth medium, rim means on the periphery of each pallet means and being of a height sufficient to retain a plant-growth medium on said pallet means, band means having upper and lower portions each of which engages the rims of adjacent pallet means, and at least one additional band means engaging an additional pallet rim and further overlapping and engaging said first band means at either the upper or lower portion thereof.

2. A pallet spool assembly according to claim 11 in which the riser means comprises a central hub having a guide point and spacer thereon.

* * * * *